(12) United States Patent
McBeath et al.

(10) Patent No.: US 8,254,942 B2
(45) Date of Patent: Aug. 28, 2012

(54) SYSTEM AND METHOD FOR RESOURCE ALLOCATION IN A WIRELESS COMMUNICATIONS SYSTEM

(75) Inventors: Sean Michael McBeath, Keller, TX (US); Anthony C. K. Soong, Plano, TX (US); Jack Smith, Valley View, TX (US)

(73) Assignee: FutureWei Technologies, Inc., Plano, TX (US)

( * ) Notice: Subject to any disclaimer, the term of this patent is extended or adjusted under 35 U.S.C. 154(b) by 655 days.

(21) Appl. No.: 12/324,210

(22) Filed: Nov. 26, 2008

(65) Prior Publication Data

US 2009/0149188 A1  Jun. 11, 2009

Related U.S. Application Data

(60) Provisional application No. 60/990,543, filed on Nov. 27, 2007.

(51) Int. Cl.
*H04W 72/00* (2009.01)

(52) U.S. Cl. ............... 455/450; 455/451; 455/452.1; 370/319; 370/321; 370/329; 370/330

(58) Field of Classification Search .............. 455/450, 455/451, 452.1; 370/329, 330, 319, 321
See application file for complete search history.

(56) References Cited

U.S. PATENT DOCUMENTS

| | | | |
|---|---|---|---|
| 6,377,572 B1 | 4/2002 | Dolan et al. | |
| 6,404,325 B1 | 6/2002 | Heinrich et al. | |
| 6,597,919 B1 | 7/2003 | Kumar et al. | |
| 6,907,246 B2 | 6/2005 | Xu et al. | |
| 7,116,240 B2 | 10/2006 | Hyde | |
| 7,215,251 B2 | 5/2007 | Hyde | |
| 7,706,323 B2 | 4/2010 | Stopler et al. | |
| 2003/0221012 A1 | 11/2003 | Herrmann et al. | |
| 2004/0145454 A1 | 7/2004 | Powell et al. | |
| 2005/0201269 A1 | 9/2005 | Shim et al. | |
| 2005/0281228 A1 | 12/2005 | Oh et al. | |
| 2006/0039274 A1 | 2/2006 | Park et al. | |
| 2006/0133312 A1 | 6/2006 | Harrison Teaque et al. | |
| 2006/0209754 A1 | 9/2006 | Ji et al. | |
| 2006/0293076 A1 | 12/2006 | Julian et al. | |
| 2007/0058523 A1 | 3/2007 | Cho et al. | |
| 2007/0060178 A1 | 3/2007 | Gorokhov et al. | |

(Continued)

FOREIGN PATENT DOCUMENTS

CN  11115899  10/1997

(Continued)

OTHER PUBLICATIONS

Written Opinion of the International Searching Authority, App. No. PCT/CN2008/071325, Date of mailing: Sep. 18, 2008, 5 pages.

(Continued)

*Primary Examiner* — Amancio Gonzalez
(74) *Attorney, Agent, or Firm* — Slater & Matsil, L.L.P.

(57) ABSTRACT

A system and method for resource allocation in wireless communications systems includes a method for operating a base station. The method includes receiving a resource request for radio resources for a mobile station and transmitting an indication of unallocated radio resources to the mobile station. A resource assignment is determined for the resource request, and the resource assignment is transmitted to the mobile station. The resource assignment comprises unallocated radio resources and a number of radio resources.

25 Claims, 8 Drawing Sheets

U.S. PATENT DOCUMENTS

| | | |
|---|---|---|
| 2007/0076670 A1 | 4/2007 | Kuchibhotla et al. |
| 2007/0097910 A1 | 5/2007 | Ji et al. |
| 2007/0206561 A1 | 9/2007 | Son et al. |
| 2007/0217370 A1 | 9/2007 | Soong et al. |
| 2007/0230412 A1 | 10/2007 | McBeath et al. |
| 2007/0274288 A1 | 11/2007 | Smith et al. |
| 2007/0286066 A1 | 12/2007 | Zhang et al. |
| 2007/0291708 A1 | 12/2007 | Rao |
| 2008/0004029 A1 | 1/2008 | Moilanen |
| 2008/0025247 A1 | 1/2008 | McBeath et al. |
| 2008/0025337 A1 | 1/2008 | Smith et al. |
| 2008/0034274 A1 | 2/2008 | Song et al. |
| 2008/0037496 A1 | 2/2008 | Smith et al. |
| 2008/0043615 A1 | 2/2008 | Li et al. |
| 2008/0062936 A1 | 3/2008 | He et al. |
| 2008/0062944 A1 | 3/2008 | Smith et al. |
| 2008/0084843 A1 | 4/2008 | Gorokhov et al. |
| 2008/0146241 A1 | 6/2008 | Das et al. |
| 2008/0192847 A1 | 8/2008 | Classon et al. |
| 2008/0240034 A1 | 10/2008 | Gollamudi |
| 2009/0022098 A1 | 1/2009 | Novak et al. |
| 2009/0029710 A1* | 1/2009 | Ochiai et al. .......... 455/450 |
| 2009/0047912 A1 | 2/2009 | Lee et al. |
| 2009/0070650 A1* | 3/2009 | Bourlas et al. .......... 714/748 |
| 2009/0075667 A1* | 3/2009 | Bourlas .......... 455/452.1 |

FOREIGN PATENT DOCUMENTS

| | | |
|---|---|---|
| CN | 1536794 A | 10/2004 |
| CN | 1780188 A | 5/2006 |
| CN | 1968452 A | 5/2007 |
| CN | 101031130 | 9/2007 |
| CN | 101102142 A | 1/2008 |
| EP | 1 786 220 A1 | 5/2007 |
| WO | WO 2006/001658 A1 | 1/2006 |
| WO | WO 2006/096887 A1 | 9/2006 |
| WO | WO 2006/099577 A1 | 9/2006 |
| WO | WO 2006/113873 A2 | 10/2006 |
| WO | WO 2006/137708 A1 | 12/2006 |
| WO | WO 2009/067955 A1 | 6/2009 |

OTHER PUBLICATIONS

First Chinese Office Action, Chinese Application No. 200880001172.3, Dated: Jul. 1, 2010, 6 pages.

Second Chinese Office Action, Chinese Application No. 200880001172.3, Dated: Feb. 28, 2011, 9 pages.

"Text Proposal for Downlink OFDMA Resource Allocation and Mapping Rules for Distributed Mode Users in E-UTRA, with Discussion on Control Information," 3GPP TSG RAN WG1 #45, R1-061149, May 8-12, 2006, pp. 1-8.

McBeath, S., et al., "Efficient Signaling for VoIP in OFDMA," 2007 Wireless Communications & Networking Conf, Mar. 2007, 6 pg, IEEE.

McBeath, S., et al., "Efficient Bitmap Signaling fo VoIP in OFDMA," 2007 Vehicular Technology Conference, Sep. 30, 2007—Oct. 3, 2007, 5 pages, IEEE.

Bourlas, Y., et al., "Persistent Allocation Updated Procedures," IEEE 802.16 Broadband Wireless Access Working Group, IEEE C802.16Maint-08/182, Apr. 19, 2008, pp. 1-50, IEEE.

"Medium Access Control Layer for Ultra Mobile Broadband (UMB) Air Interface Specification," 3rd Generation Partnership Project 2, 3GPP2 C.S0084-002-0, V2.0, Aug. 2007, 314 pages, 3GPP2.

"Technical Specification Group Radio Access Network; Physical Layer Aspects for Evolved UTRA (Release 7)," 3rd Generation Project, 3GPP TR 25.814, V1.3.1, May 2006, pp. 6-11.

Third Chinese Office Action, Chinese Application No. 200880001172.3, Jun. 15, 2011, 9 pages.

U.S. Appl. No. 60/888,833, Classon et al., filed Feb. 8, 2007, Specification and Drawings.

"Medium Access Control Layer for Ultra Mobile Broadband (UMB) Air Interface Specification," 3rd Generation Partnership Project 2, 3GPP2 C.S0084-002-0, Version 2.0, Aug. 2007, 157 pages, 3GPP2.

Bourlas, Y., et al., "Persistent Allocation Updated Procedures," IEEE 802.16 Broadband Wireless Access Working Group, IEEE P802.16Rev2/D4, Apr. 19, 2008, pp. 1-50, IEEE.

Written Opinion of the International Searching Authority, App. No. PCT/CN2008/071317, Date of mailing: Sep. 18, 2008, 4 pages.

Written Opinion of the International Searching Authority, App. No. PCT/CN2008/073221, Date of mailing: Mar. 5, 2009, 3 pages.

* cited by examiner

HW 07FW102

| PARAMETER NAME | NUMBER OF BITS | |
|---|---|---|
| SUBCHANNEL OFFSET | 8 | ← 514 |
| SYMBOL OFFSET | 8 | ← 516 |
| NUMBER OF SUBCHANNELS | 8 | ← 518 |
| NUMBER OF SYMBOLS | 8 | ← 519 |
| REPACKAGE | 1 | ← 520 |

← 500

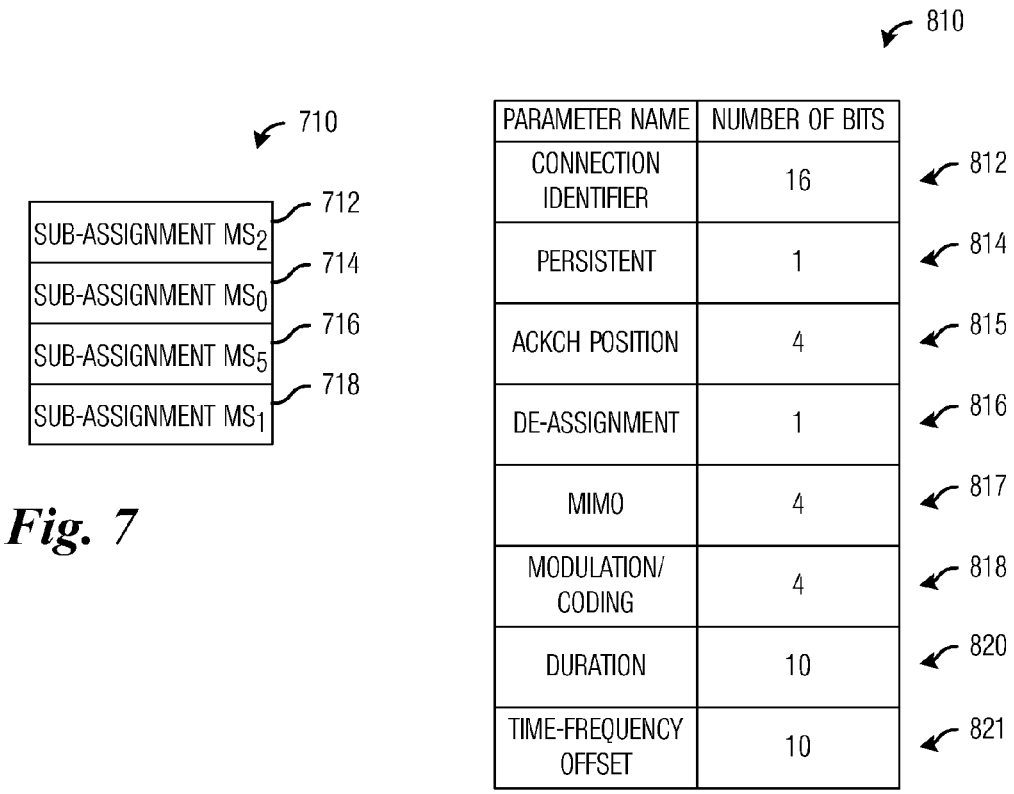
Fig. 7
Fig. 8
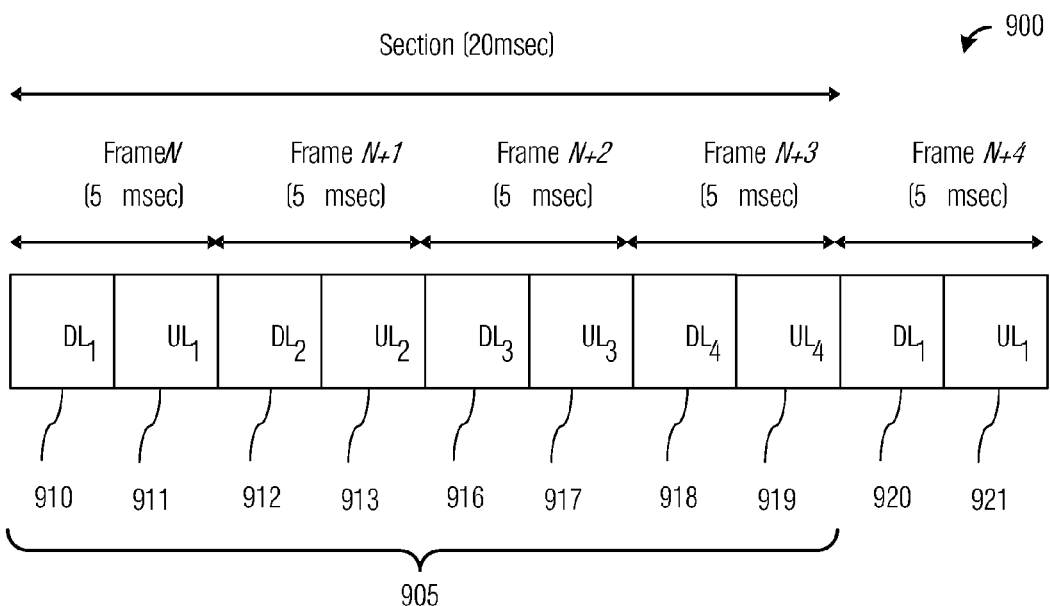
Fig. 9

SYSTEM AND METHOD FOR RESOURCE ALLOCATION IN A WIRELESS COMMUNICATIONS SYSTEM

This application claims the benefit of U.S. Provisional Application No. 60/990,543, filed on Nov. 27, 2007, entitled "Method and Apparatus for Filling a Resource Hole in a Wireless Communication System," which application is hereby incorporated herein by reference.

CROSS REFERENCE TO RELATED APPLICATIONS

This application is related to U.S. patent application Ser. No. 12/134,025, filed Jun. 5, 2008, entitled "Method and Apparatus for Sharing Resources in a Wireless System," which patent application is hereby incorporated herein by reference.

TECHNICAL FIELD

The present invention relates generally to a system and method for wireless communications, and more particularly to a system and method for resource allocation in wireless communications systems.

BACKGROUND

In an orthogonal frequency division multiple access (OFDMA) communications system, time-frequency resources of the system are shared among a plurality of mobile stations (MS). A base station (BS) assigns resources to MS using an assignment message, which is typically transmitted as part of a control channel. To minimize control channel overhead, it is known for the BS to make persistent assignments, wherein the assignment message is transmitted to the MS initially to indicate an assigned time-frequency resource, and then the BS uses the same time-frequency resource for subsequent transmissions to (or receptions from) the MS.

The subsequent transmissions (or receptions) may be hybrid automatic repeat request (H-ARQ) transmissions of the same packet, for subsequent transmissions of different packets, or for initial transmissions of a series of packets. For example, in a voice over internet protocol (VoIP) system, the BS make a persistent resource assignment to a particular MS consisting of a particular time-frequency resource with a period equal to 20 msec (equal to a vocoder period). Then, the BS may use this resource for a first H-ARQ transmission of each VoIP packet. Subsequent transmissions, if necessary, must be signaled.

The initially assigned time-frequency resource may be maintained by the BS for the MS until a timer elapses, a VoIP talk-spurt is completed, a VoIP call is completed, a certain number of negative acknowledgements is detected by the base station, until the resource is explicitly or implicitly de-assigned by the base station, or so on. When one of these events occurs (i.e., when the persistent assignment expires), there may be a hole in the set of time-frequency resources of the communications system, with the released previously allocated time-frequency resource(s) being referred to as a resource hole. The BS may assign the released previously allocated time-frequency resource(s) (i.e., the resource hole) to a new MS if the number of resources required by the new MS is equal to or less than the number of resources in the resource hole. Unfortunately, due to different packet sizes, modulation and coding characteristics, bandwidth requirements, and so forth, the number of resources required by the new MS may be different than the number of resources in the resource hole. Thus, there is a need for efficiently allocating time-frequency resources resulting from expired persistent assignments.

SUMMARY OF THE INVENTION

These and other problems are generally solved or circumvented, and technical advantages are generally achieved, by embodiments of a system and a method for resource allocation in a wireless communications networks.

In accordance with an embodiment, a method for operating a base station in a communications system is provided. The method includes receiving a resource request for radio resources for a mobile station, transmitting an indication of unallocated radio resources to the mobile station, determining a resource assignment for the resource request, and transmitting the resource assignment to the mobile station. The resource assignment includes at least one of the indicated unallocated radio resources and a number of radio resources.

In accordance with another embodiment, a method for operating a mobile station in a communications system is provided. The method includes receiving an indication of unallocated radio resources from a base station, receiving a resource assignment from the base station, and determining assigned radio resources from the resource assignment. The resource assignment includes an assignment of at least one of the indicated unallocated radio resources and a number of radio resources.

In accordance with another embodiment, an electronic device is provided. The electronic device includes a base station that coordinates communications of a mobile station associated with the base station, and a scheduler coupled to the base station. The communications are coordinated using resource requests transmitted to the base station. The scheduler determines allocatable resources based on a resource request, with the allocatable radio resources comprising unallocated resources, wherein the unallocated resources being sequentially numbered and allocated based on the numbering, assigns resources, and updates assigned resources.

In accordance with another embodiment, a method for communicating with a mobile station by a base station is provided. The method includes transmitting an indication of a one or more resource holes to a mobile station, each indication identifying one or more resources as being available, and determining a time-frequency resource assignment for the mobile station from a set of resources indicated as resource holes, the time-frequency resource assignment includes a starting position and a number of time-frequency resources. The method also includes transmitting the time-frequency resource assignment to the mobile station, and communicating with the mobile station using the determined time-frequency resources. The communicating includes transmitting a packet to the mobile station or receiving a packet from the mobile station.

In accordance with another embodiment, a method for communicating with a base station by a mobile station is provided. The method includes receiving an indication of a one or more resource holes from a base station, each indication identifying one or more resources as being available, and receiving a time-frequency resource assignment from a base station, the time-frequency resource includes a starting position and a number of time-frequency resources. The method also includes determining a time-frequency resource assignment from a set of resources indicated as resource holes, beginning with the starting position, continuing for the number of time-frequency resources, and communicating with the base station using the determined time-frequency resources. The communicating includes transmitting a packet to the base station or receiving a packet from the base station.

An advantage of an embodiment is that resources holes may be allocated to an MS for use, thereby increasing efficiency of the communications network.

A further advantage of an embodiment is that an MS requiring more resources than available in a single resource hole may be allocated resources from multiple resource holes, further increasing efficiency of the communications network.

Yet another advantage of an embodiment is that resources in the resource holes may be allocated in an order to help reduce a likelihood that an MS would transmit over multiple resources in a single time period, thereby increasing the MS' communications efficiency.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 7 is a diagram of a control channel with sub-assignment messages;

FIG. 8 is a diagram of a sub-assignment message;

FIG. 9 is a diagram of a repeating sequence of frames;

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely an orthogonal frequency division multiplexing (OFDM) or an orthogonal frequency division multiple access (OFDMA) communications network, such as those Evolved Universal Terrestrial Radio Access (E-UTRA) networks, Ultra Mobile Broadband (UMB) networks, IEEE 802.16 networks, and other OFDMA based networks. The invention may also be applied, however, to other forms of communications networks such as code division multiple access (CDMA), time division multiple access (TDMA), and frequency division multiple access (FDMA) communications systems. Examples of CDMA communications systems include cdma2000 and Wideband CDMA (W-CDMA), while Global System for Mobile (GSM) and Integrated Digital Enhanced Network (iDEN) are examples of TDMA communications systems. Examples of FDMA communications systems include Advanced Mobile Phone Service (AMPS) communications systems.

Figure 1:
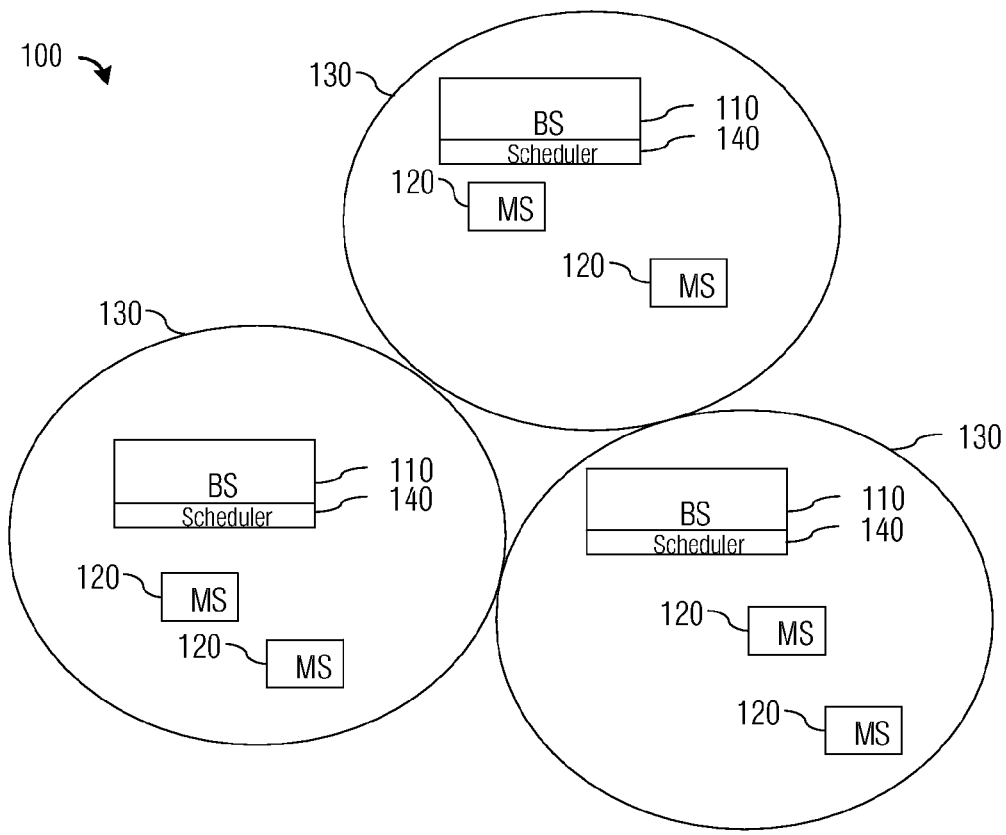
FIG. 1 is a diagram of a wireless communications network.

FIG. 1 shows a wireless communications network 100. The wireless communications network 100 includes a plurality of BS 110 providing voice and/or data wireless communications service to a plurality of MS 120. A BS may also be referred to as an access point (AP), an access network (AN), a Node-B, and so forth. Each BS 110 may have a corresponding coverage area 130. As shown in FIG. 1, each BS 110 includes a scheduler 140 for assigning radio resources to corresponding MS 120.

Exemplary wireless communications systems include Evolved Universal Terrestrial Radio Access (E-UTRA) networks, Ultra Mobile Broadband (UMB) networks, IEEE 802.16 compliant networks, and other OFDMA based networks. For example, the wireless communications network 100 may be a frequency division multiple access (FDMA) network wherein the time-frequency resources are divided into frequency intervals over a certain time interval, a time division multiplex access (TDMA) network wherein the time-frequency resources are divided into time intervals over a certain frequency interval, and a code division multiplex access (CDMA) network wherein the resources are divided into orthogonal or pseudo-orthogonal codes over a certain time-frequency interval.

Figure 2:
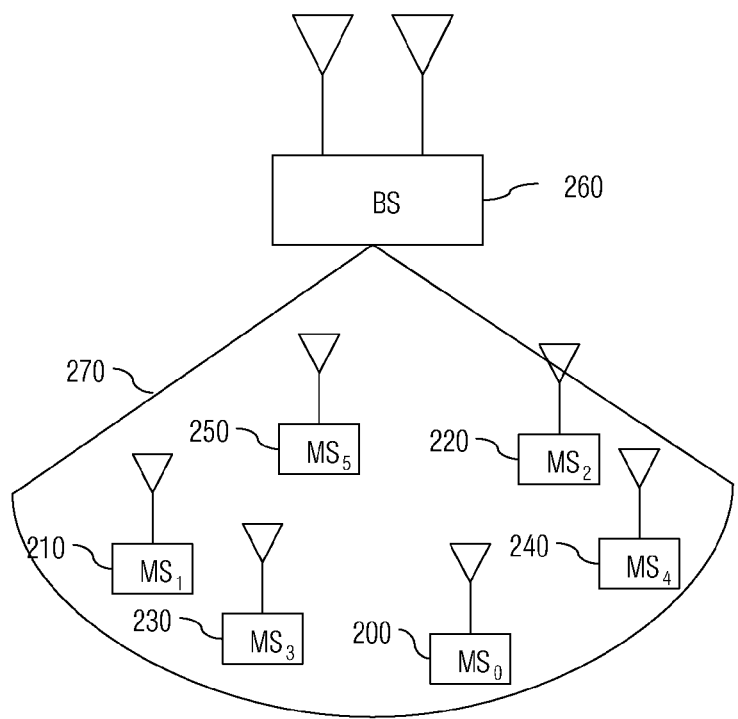
FIG. 2 is a diagram of a base station in a wireless communications network.

FIG. 2 illustrates a detailed view of a BS 260 operating in a wireless communications network. In general, the BS 260 may have three coverage areas with coverage area 270 shown in FIG. 2. Six MS 200, 210, 220, 230, 240, and 250 may be operating in the coverage area 270. The BS 260 may assign to each MS (200, 210, 220, 230, 240, and 250) one or more connection identifiers (CID) or some other similar identifier to facilitate time-frequency resource assignment. The CID assignment may be transmitted from the BS 260 to the MS over a control channel. Alternatively, the CID assignment may be permanently stored at the MS or derived based on parameter of the MS or BS 260.

Figure 3:
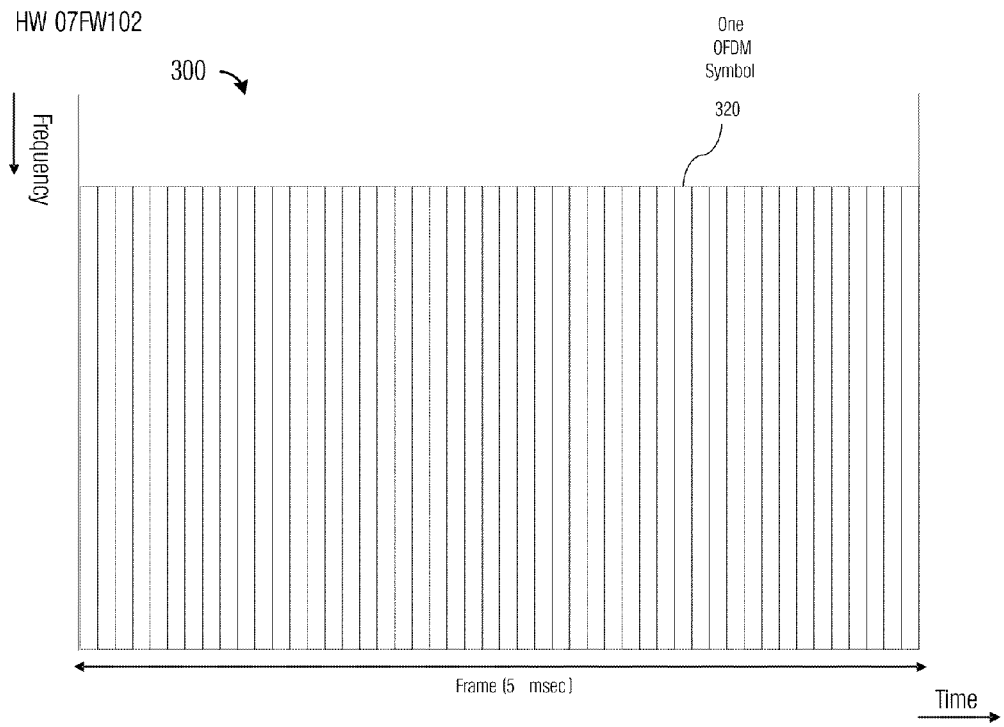
FIG. 3 is a diagram of a set of OFDMA time-frequency radio resources in an OFDMA frame.

FIG. 3 illustrates a view of a set of OFDMA time-frequency radio resources of an OFDMA frame 300. Generally, in OFDMA communications systems, the time-frequency radio resources are divided into OFDM symbols and OFDM subcarriers for allocation by a scheduler of a BS, such as scheduler 140, the MS. In an exemplary OFDMA communications system, the OFDM subcarriers may be approximately 10 kHz apart with a duration of each OFDM symbol being approximately 100 μsec.

FIG. 3 illustrates a single five (5) msec frame of an OFDMA communications system, such as that defined by the IEEE 802.16e standard. According to the IEEE 802.16e standard, five msec is one possible frame duration and that other frame durations are possible. As shown in FIG. 3, resources in the time domain (shown in the x-axis) may be divided into 48 OFDM symbols, such as OFDM symbol 320, while in the frequency domain (y-axis), the resources may be divided into multiple subchannels (not shown), wherein the size of a subchannel may depend on a subcarrier permutation scheme being used. A permutation scheme is a mapping from logical subchannels to physical subcarriers.

For example, downlink (DL) partial usage of subcarriers (PUSC), DL full usage of subcarriers (FUSC), and uplink (UL) PUSC are exemplary subcarrier permutations schemes defined in the IEEE 802.16 standard. Other permutation schemes are also defined in the IEEE 802.16 standard, so DL PUSC, DL FUSC, and UL PUSC are merely used to illustrate the invention and should not be construed as being limiting to either the scope or the spirit of the embodiments. For DL PUSC, with a five (5) MHz bandwidth, there are 360 data subcarriers divided into 15 subchannels, with 24 data subcarriers for each subchannel. For DL PUSC, the BS may be required to assign an even number of OFDM symbols for each subchannel. For DL FUSC, with a five MHz bandwidth, there are 384 data subcarriers divided into eight (8) subchannels, with 48 data subcarriers for each subchannel. For UL PUSC, for a five MHz bandwidth, there are 408 subcarriers (including both data and pilot subcarriers) divided into 17 subchannels, wherein each subchannel has 24 subcarriers (16 data plus eight pilot subcarriers). For UL PUSC, the number of OFDM symbols for each subchannel must be a multiple of 3.

Subchannels may be a logical representation of the time-frequency resources of the OFDMA communications system. Each logical time-frequency resource (subchannel) maps to a physical time-frequency resource. The mapping of logical time-frequency resources to physical time-frequency resources depends on which subcarrier permutation is being used. The mapping of logical time-frequency resource to physical time-frequency resources may change with time and may depend on a number of parameters defined by the OFDMA communications system.

Figure 4:
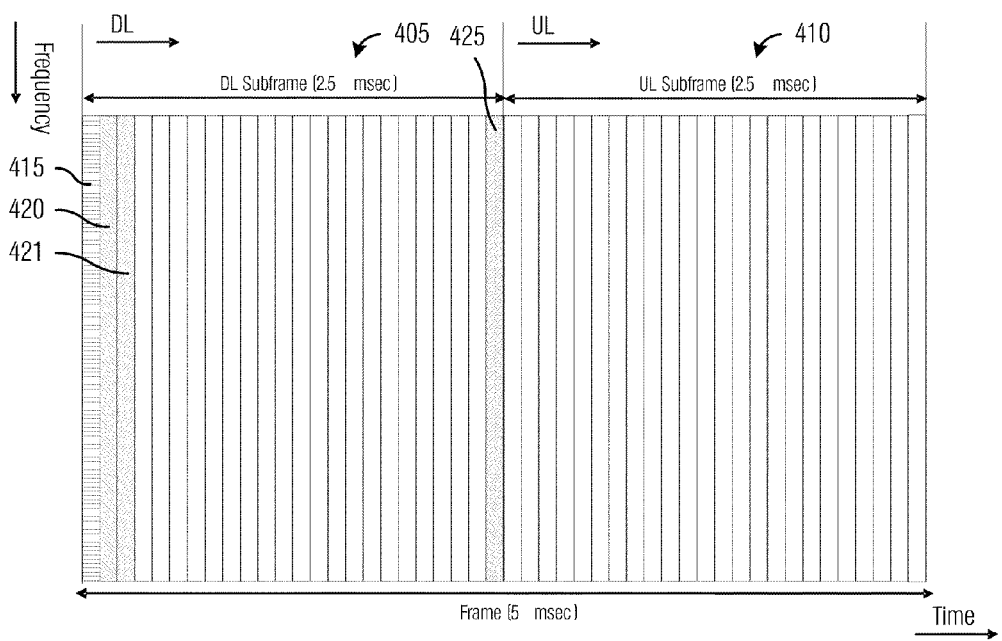
FIG. 4 is a diagram of a partitioned OFDMA frame.

FIG. 4 illustrates a partitioning of an OFDMA frame 400, such as shown in FIG. 3, into a downlink (DL) subframe 405 and an uplink (UL) subframe 410. As shown in FIG. 4, the time-frequency resources correspond to a time division duplex (TDD) communications system, such as defined by the IEEE 802.16e standard. Although the discussion herein will be focused on a TDD communications system, embodiments may also apply equally to frequency division duplex (FDD) communications systems and half-duplex frequency division duplex (H-FDD) communications systems. Therefore, the discussion of a TDD communications system should not be construed as being limiting to either the scope or the spirit of the embodiments.

The resources in the time domain (x-axis) are divided into two equal portions; denoted as DL subframe 405 and UL subframe 410. Both DL subframe 405 and UL subframe 410 are comprised of 24 OFDM symbols. A first DL OFDM symbol 415 may be allocated for use as a preamble, which is used for timing and frequency synchronization by the MS. A second DL OFDM symbol 420 and a third DL OFDM symbol 421 may be used to transmit control information. A twenty-fourth DL OFDM symbol 425 may be allocated as a guard period. There may also be a guard period following the UL subframe of one or more OFDM symbols, but is not shown in FIG. 4.

Figures 5, 6:
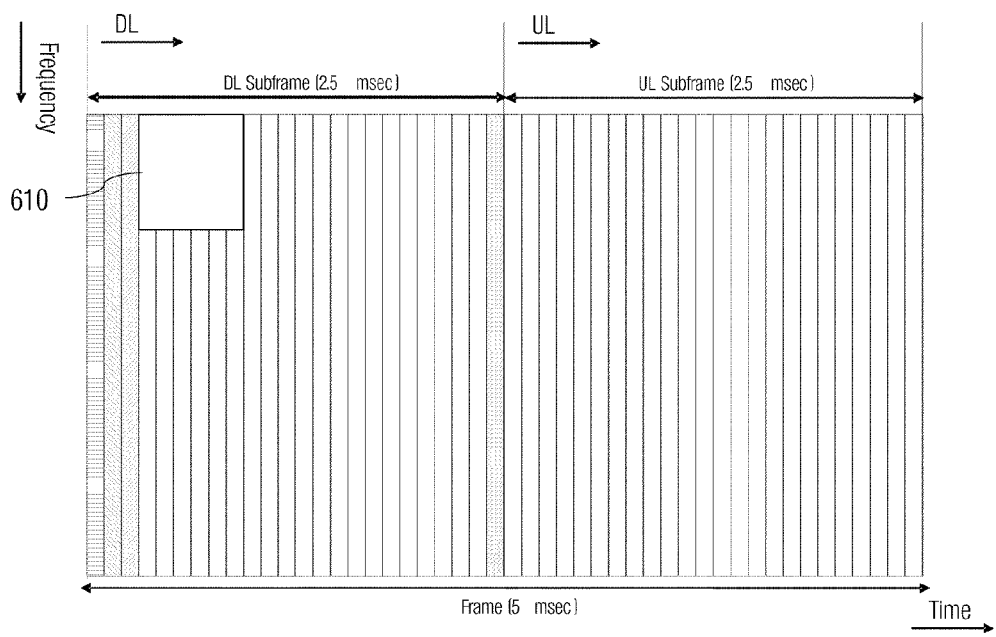
FIG. 5 is a diagram of an assignment message.
FIG. 6 is a diagram of a time-frequency resource assignment.

FIG. 5 illustrates an assignment message 500. Assignment message 500 may contain multiple fields and may be used by the BS to inform one or more MS of their time-frequency resource assignment. Assignment message 500 may also convey to the MS associated parameters related to the time-frequency resource assignment. A subchannel offset field 514 is an 8-bit field that may be used for indicating a beginning subchannel. A symbol offset field 516 is an 8-bit field that may be used for indicating a beginning OFDM symbol. A number of subchannels field 518 is an 8-bit field that may be used for indicating a number of subchannels in the time-frequency resource allocation. A number of symbols field 519 is an 8-bit field and may be used for indicating a number of OFDM symbols in the time-frequency resource allocation. The time-frequency resource allocation defined by an assignment message may be referred to as a region.

A repackage field 520 is a 1-bit field that may be used for indicating whether the MS currently located within a coverage area of the time-frequency resource assignment should reshuffle according to any resource holes. In some embodiments, the MS may fill in resource holes as will be discussed in more detail below in response to repackage field 520. Repackage field 520 may be used to indicate whether MS should fill in the indicated resource holes or not.

Although FIG. 5 illustrates a specific number of bits for each field of assignment message 500, the number of bits for each field may change depending on the communications system as well as the associated parameters. Further, additional fields may be needed in some embodiments, while in other embodiments, fewer fields may be needed. For example, in some embodiments, time-frequency resource assignments for an Nth MS may depend on the number of time-frequency resources assignments made to MS 1, MS 2, . . . , and MS N−1. In such an embodiment, the BS may need only to signal a number of time-frequency resources assigned to each MS. In some embodiments, the resource assignments occur only within a pre-defined region, such as in an UL subframe, such as UL subframe 410.

FIG. 6 illustrates an exemplary time-frequency resource assignment 610. As shown in FIG. 6, time-frequency resource assignment 610 has includes 4 OFDM subchannels (begins at OFDM subchannel zero (0) and ends at OFDM symbol three (3)) and has a duration of 6 OFDM symbols. The BS may indicate this time-frequency resource assignment using an assignment message, such as assignment message 500. Several MS may have resource assignments within time-frequency resource assignment 610.

FIG. 7 illustrates an exemplary control channel containing a list 710 of sub-assignment messages. The BS may transmit multiple sub-assignment messages, each sub-assignment message indicating a portion of the time-frequency resources indicated in an assignment message. Referring back to FIG. 2, consider a group of six MS arranged as shown, BS 260 transmits sub-assignment message 712 to $MS_2$ 220, sub-assignment message 714 to $MS_0$ 200, sub-assignment message 716 to $MS_5$ 250, and sub-assignment message 718 to $MS_1$ 210.

Based on information contained in the sub-assignment messages, the MS may determine their time-frequency resource assignments and associated parameters. The order of the sub-assignment message 712-718 may be related to an order of the time-frequency resources within the time-frequency resource indicated in the assignment message. For example, $MS_2$ is allocated resources first, $MS_0$ is allocated the resources second (following the allocation of resources for $MS_2$), and so forth.

FIG. 8 illustrates a sub-assignment message 810. Sub-assignment message 810 may be used in association with assignment messages, such as assignment message 500. Sub-assignment message 810 includes a 16-bit connection identifier field 812 that may be used to identify an intended MS (an intended recipient of sub-assignment message 810). A persistent field 814 is a 1-bit field, which may be used to distinguish a persistent assignment from a non-persistent assignment. An ACKCH position field 815 is a 4-bit field that may be used to indicate an ACKCH position. A de-assignment field 816 is a 1-bit field that may be used to indicate if the allocation is a de-assignment. If de-assignment field 816 is set to '1,' for example, some of the other fields in sub-assignment message 810 may not be needed. If de-assignment field 816 is set to '1,' then the sub-assignment message may be referred to as a de-assignment message.

A MIMO field 817 is a 4-bit field, which may be used to indicate parameters associated with a multiple input multiple output (MIMO) antenna scheme. A modulation/coding field 818 is a 4-bit field that may be used for indicating the modulation and coding of packets. A duration field 820 is a 10-bit field that may be used for indicating a number of time-frequency resources for the MS. A time-frequency offset field 821 is a 10-bit field that may be used for indicating an offset relative to a time-frequency resource specified in an associated assignment message.

Not all fields shown in FIG. 5 and FIG. 8 may be used in all embodiments. Furthermore, in some embodiments, additional fields may be added. For example, in some embodiments, repackage field 520 (FIG. 5) may be placed in sub-assignment message 810. For example, if repackage field 520 is set, the MS may fill in resource holes as will be discussed in more detail below. While, if repackage field 520 is not set, the MS may not fill in resource holes. As an additional example, for use as a de-assignment message, sub-assignment message 810 may include a flag, indicating whether other new MS should fill in the resource hole left by the de-assignment message. In some embodiments, the fields of the assignment message and sub-assignment message may be combined into a single message.

FIG. 9 illustrates a repeating sequence of frames 900. As discussed previously, a frame may be defined as 5 msec in duration and contains both DL and UL subframes. A section 905 may be defined as being 20 msec in duration and contains four frames (four pairs of DL and UL subframes). Section 905 includes a first DL subframe 910 denoted $DL_1$, a second DL subframe 912 is denoted $DL_2$, a third DL subframe 916 is denoted $DL_3$, and a fourth DL subframe 918 is denoted $DL_4$. A fifth DL subframe 920, not part of section 905 is also denoted $DL_1$. Similarly, a first UL subframe 911 is denoted $UL_1$, a second UL subframe 913 is denoted $UL_2$, a third UL subframe 917 is denoted $UL_3$, a fourth UL subframe 919 is denoted $UL_4$, while a fifth UL subframe 921 (not part of section 905) is also denoted $UL_1$. As shown in this example, communications system timing may be tied to a section and repeats every 20 msec.

Figures 10, 11A, 11B, 11C:
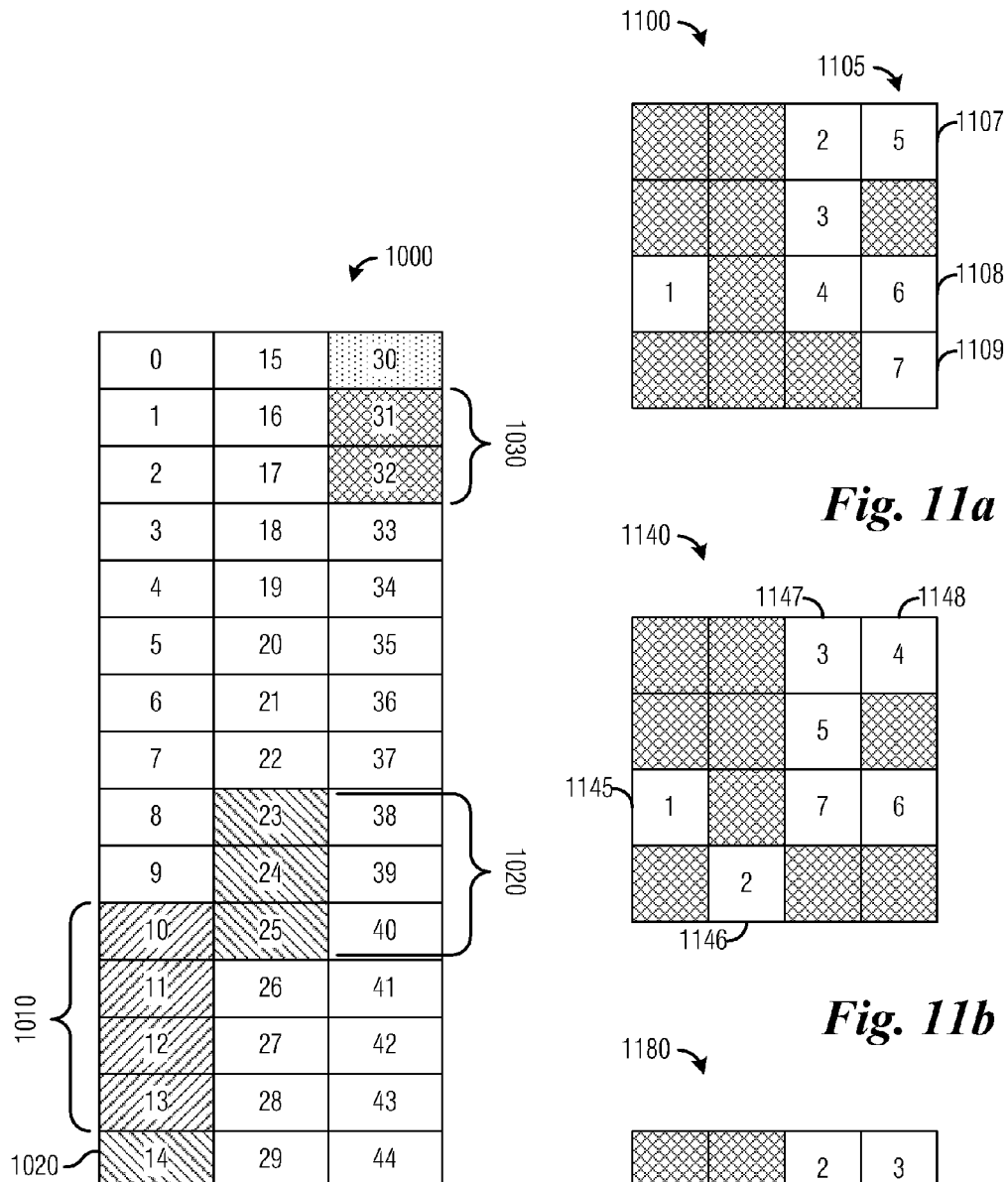
FIG. 10 is a diagram of a region of time-frequency resources.
FIG. 11a is a diagram of a region with resource holes numbered.
FIG. 11b is a diagram of a region with resource holes numbered using a different numbering algorithm.
FIG. 11c is a diagram of a region with resource holes numbered, wherein there is a different set of resource holes.

FIG. 10 illustrates a region 1000. Region 1000 comprises fifteen subchannels over three OFDM symbols, for a total of 45 individual time-frequency resources numbered from zero (0) to 44. At an instant of time, time-frequency resources zero through nine, 15 through 22, 26 through 29, and 33 through 44 may be allocated for use by a variety of MS. This may leave time-frequency resources 10 through 14, 23 through 25, and 30 through 32 available for allocation to other MS. Time-frequency resources 10 through 14, 23 through 25, and 30 through 32 may be referred to as resource holes left by previous resource allocations now released.

Unfortunately, the resource holes left by the releasing (de-assignment) of previous resource allocations to MS may not exactly match the resources needed by MS requiring bandwidth. To mitigate this problem, the BS may transmit an indication of region 1000 as well as an indication of the resource holes in region 1000 to the MS requiring bandwidth. In some embodiments, an indication of region 1000 may not be needed since it is known by the MS, such as in the UL subframe. Furthermore, the BS may transmit a duration for each MS indicating a number of time-frequency resources for each MS. The indication of each resource hole may be a de-assignment message for another MS, a beginning and ending resource number, a beginning resource number and a number of time-frequency resources (i.e., a duration), a bit map wherein each bit represents a particular time-frequency resource, and so forth.

As an example, consider that the BS indicates that time-frequency resources 10 through 24, 23 through 25, and 30 through 32 are resource holes using three de-assignment messages. In order to make resource assignments to MS requiring bandwidth, the BS may transmit an indication of region 1000 and a number of time-frequency resources for each MS. The BS may allocate four time-frequency resources to a first MS (shown as contiguous group of time-frequency resources 10 through 13 1010), four time-frequency resources to a second MS (shown as non-contiguous group of time-frequency resources 14, 23 through 25 1020), and two time-frequency resources to a third MS (shown as contiguous group of time-frequency resources 31 and 32 1030). The resource allocations made to the MS requiring bandwidth may be made in the order in which their corresponding sub-assignment messages are transmitted.

FIG. 11a illustrates a region 1100 wherein resource holes are numbered using a time-frequency resource numbering scheme. Region 1100 comprises sixteen individual time-frequency resources with shaded boxes representing allocated time-frequency resources and numbered boxes representing unallocated time-frequency resources (resource holes). As shown in FIG. 11a, the resource holes within a single sub-channel may be numbered in an OFDM symbol-first order. Therefore, the three resource holes in OFDM symbol 1105 may be numbered time-frequency resource five (5) 1107, time-frequency resource six (6) 1108, and time-frequency resource seven (7) 1109, respectively. The other resource holes in region 1100 may be similarly numbered.

The BS and the MS may know the numbering of the resource holes, for example, the BS may message the MS with the numbering of the resource holes or the BS and the MS know the resource hole numbering scheme so that given an indication of resource holes, the BS and the MS know the numbering of the resource holes.

The BS may then make a resource allocation by messaging the MS with a starting resource hole number and a resource allocation duration in a sub-assignment message. For example, the BS may message in a sub-assignment message to an MS that the MS has been allocated four (4) time-frequency resources starting at resource hole number three (3), which would include time-frequency resources numbered three (3), four (4), five (5), and six (6).

FIG. 11b illustrates a region 1140 wherein resource holes are numbered using a time-frequency resource numbering scheme that helps to improve MS performance. The resource hole number scheme illustrated in FIG. 11a may produce problems in UL transmissions wherein an MS is located at a periphery of a coverage area of a communications system. When an MS at the periphery of a coverage area, transmissions made by the MS should be made at maximum power to help improve performance. However, if the MS is assigned time-frequency resources transmitting simultaneously (i.e., multiple time-frequency resources within a single OFDM symbol), the MS will need to divide the transmission power between the time-frequency resources. This may reduce performance since the transmissions occurring in each time-frequency resource is not occurring at maximum power.

As with region 1100, region 1140 comprises sixteen individual time-frequency resources with shaded boxes representing allocated time-frequency resources and numbered boxes representing unallocated time-frequency resources. However, the numbering of the resource holes follows a different numbering scheme. The numbering may begin with a lowest time-frequency resource of a lowest time domain resource being numbered time-frequency resource one (1), time-frequency resource 1145. The numbering continues by moving on to a lowest time-frequency resource of a next lowest numbered time domain resource and numbering it time-frequency resource two (2), time-frequency resource 1146. This is continued until a final time-frequency resource of the region is numbered.

Although the discussion of the numbering of the resource holes above starts with a lowest time-frequency resource of a lowest time domain resource and increments, the number of resource holes may start with a highest time-frequency resource of a lowest time domain resource and increments, or a highest time-frequency resource of a lowest time domain resource and decrements, or a highest time-frequency resource of a highest time domain resource and decrements, and so forth. Therefore, the discussion presented above should not be construed as being limiting to either the scope or the spirit of the embodiments.

As shown in FIG. 11b, consecutively numbered time-frequency resources do not share OFDM symbols, which means that an MS will not need to transmit more than one time per OFDM symbol unless the MS has a particularly large resource allocation. Generally, this numbering scheme reduces the probability that consecutively numbered time-frequency resources share a single OFDM symbol. For example, for region 1140, resource allocations of two time-frequency resources or smaller are ensured of not transmitting more than one time per OFDM symbol. Furthermore, in many cases, resource allocations of three time-frequency resources also do not transmit more than one time per OFDM symbol.

FIG. 11c illustrates a region 1180 wherein resource holes are numbered using a time-frequency resource numbering scheme that helps to improve MS performance. FIG. 11c shows a number of resource holes using the numbering scheme discussed in FIG. 11b, where region 1180 has a different configuration of resource holes.

When the BS indicates resource holes to MS, any number of resource holes may be used as long as the numbering scheme is known at both the BS and the MS. For example, the simple numbering shown in FIG. 10 and FIG. 11a may be used or the more advanced number of FIG. 11b and FIG. 11c may be used.

Figure 12:
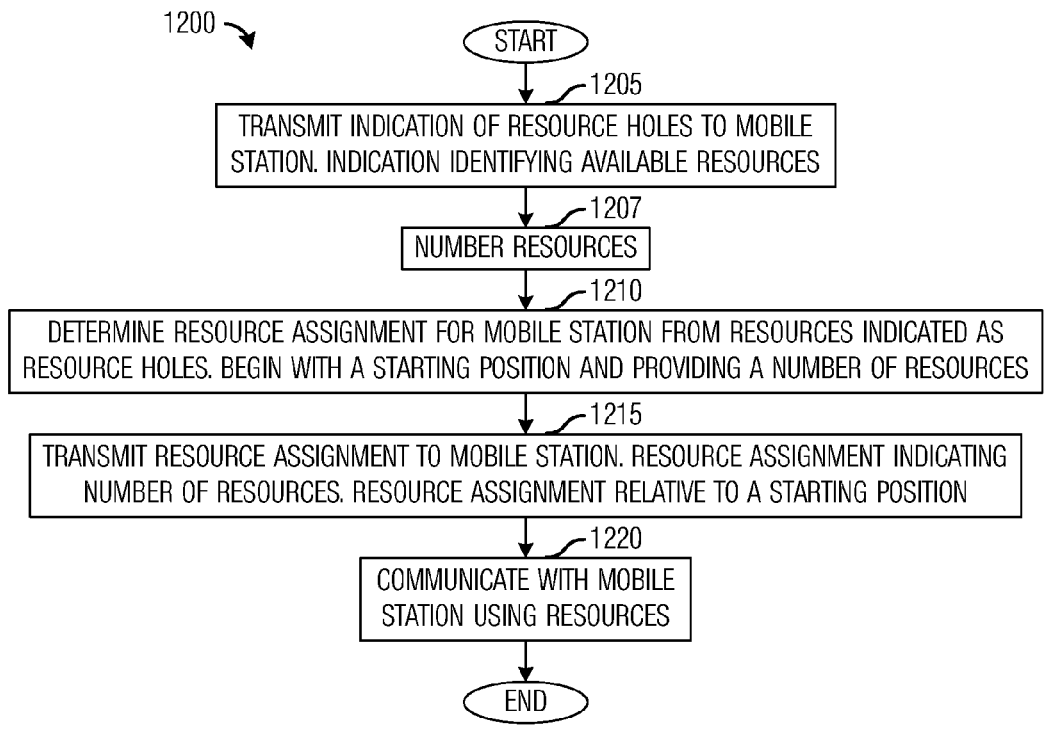
FIG. 12 is a flow diagram of an algorithm for base station operation.

FIG. 12 illustrates a flow diagram of an algorithm 1200 for BS operation in resource allocation in a communications system. Algorithm 1200 may be representative of events taking place in a BS of a communications system when the BS is making resource allocations.

Resource allocation may begin when the BS transmits an indication of one or more resource holes to a MS, with each indication identifying one or more time-frequency resources as being available (block 1205). The indication may be a de-assignment message for another MS or an explicit indication of each resource hole. For example, a resource hole may be identified by a starting time-frequency resource number and an ending time-frequency resource number. In some embodiments, the indication is a bitmap wherein each bit corresponds to a resource.

After transmitting the indication, the BS may number the resource holes (block 1207). Numbering the resource holes may produce a sequentially numbered list of resource holes, potentially making it simpler to assign the resource holes and reducing an amount of information needed to specify the resource assignment. This may reduce the amount of information transmitted in the communications system.

The BS may determine a time-frequency resource assignment for the MS from the set of time-frequency resources indicated as resource holes, beginning with the starting position, continuing for the number of time-frequency resources (block 1210).

The BS may then transmit a time-frequency resource assignment to a MS, wherein the time-frequency resource assignment may indicate a number of time-frequency resources, the time-frequency resource assignment relative to a starting position (block 1215). The starting position can be explicitly signaled or can be dependent on an assignment for another mobile station. For example, the starting position for a second mobile station can depend on the number of resources assigned to a first mobile station.

The BS may then communicate with the MS using the allocated time-frequency resources (block 1220). Communicating may include transmitting a packet to the MS and/or receiving a packet from the MS.

Figure 13:
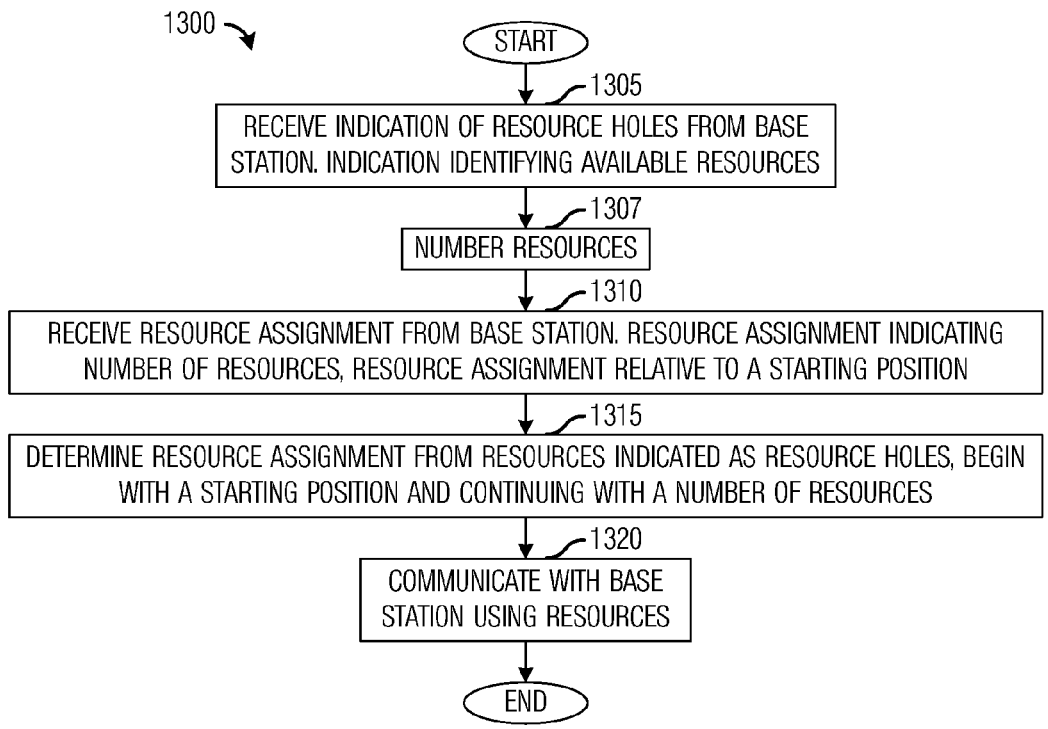
FIG. 13 is a flow diagram of an algorithm for mobile station operation.

FIG. 13 illustrates a flow diagram of an algorithm 1300 for MS operation in resource allocation in a communications system. Algorithm 1300 may be representative of events taking place in a MS of a communications system when a BS of the communications system is making resource allocations.

Resource allocation may begin when the MS receives an indication of a one or more resource holes from the BS, each indication identifying one or more time-frequency resources as being available (block 1305). After receiving the indication, the MS may number the resource holes (block 1307). Numbering the resource holes may produce a sequentially numbered list of resource holes, potentially making it simpler to determine the resource holes assigned in a resource assignment. This may reduce the amount of information transmitted in the communications system.

The MS may then receive a time-frequency resource assignment from the BS, the time-frequency resource assignment may indicate a number of time-frequency resources, with the time-frequency resource assignment relative to a starting position (block 1310).

The MS determines the time-frequency resource assignment from the set of resources indicated as resource holes, beginning with the starting position, continuing for the number of time-frequency resources (block 1315). The MS may then communicate with the BS using the determined time-frequency resources. Communicating may include transmitting a packet to the BS and/or receiving a packet from the BS.

Figure 14A:
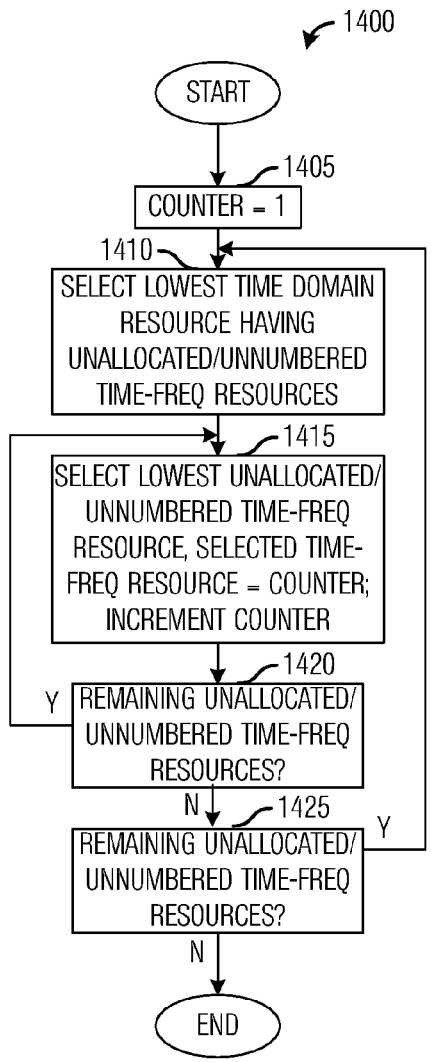
FIG. 14a is a flow diagram of a resource hole numbering algorithm.

FIG. 14a illustrates a flow diagram of an algorithm 1400 for numbering resource holes in a region. Algorithm 1400 may be representative of events taking place in a BS or a MS of a communications system when numbering resource holes. Algorithm 1400 may occur at regularly scheduled times, or at the occurrence of an event. For example, a MS may number resource holes when it receives a message from a BS instructing it to do so, a BS may number resource holes after it has allocated and released resource holes a specified number of times, and so forth.

Resource hole numbering may begin by initializing a counter "COUNTER" equal to one (1) (block 1405). COUNTER may be use to maintain a count of resource holes in a region. Alternatively, rather than setting COUNTER to one (1), COUNTER may be set to zero (0) or some other agreed starting value. After initializing COUNTER, a selection of a lowest time domain resource (i.e., an OFDM symbol) that has unallocated or unnumbered time-frequency resources (i.e., resource holes) (block 1410).

After selecting the lowest time domain resource with unallocated/unnumbered time-frequency resources (block 1410), a lowest unallocated/unnumbered time-frequency resource in the selected lowest time domain resource may be selected, numbering the selected time-frequency resource the value of COUNTER, and after the selected time-frequency resource has been numbered, COUNTER may be incremented (block 1415). A check may then be performed to determine if there are any more unallocated/unnumbered time-frequency resources in the selected lowest time domain resource (block 1420).

If there are additional unallocated/unnumbered time-frequency resources in the selected lowest time domain resource, then a lowest unallocated/unnumbered time-frequency resource in the selected lowest time domain resource may be selected, numbering the selected time-frequency resource the value of COUNTER, and after the selected time-frequency resource has been numbered, COUNTER may be incremented (block 1415).

If there are no more unallocated/unnumbered time-frequency resources in the selected lowest time domain resource, then a check for any more unallocated/unnumbered time-frequency resources may be performed (block 1425). If there are no more unallocated/unnumbered time-frequency resources, then the numbering of resource holes may terminate. If there are more unallocated/unnumbered time-frequency resources, then the numbering of resource holes may return to block 1410 to select a lowest time domain resource with unallocated/unnumbered time-frequency resources. The numbering of unallocated/unnumbered time-frequency resources in the time domain resource may continue as described above.

Although the discussion of the numbering of resource holes presented above begins by initializing COUNTER to one (1) and increments the counter, alternative embodiments may begin by initializing COUNTER to a number of unallocated/unnumbered time-frequency resources and decrements the counter. Furthermore, instead of starting with a lowest time domain resource, the numbering of resource holes may start with a highest time domain resource. Therefore, the discussion of the numbering of resource holes presented above should not be construed as being limiting to either the scope or the spirit of the embodiments.

Figure 14B:
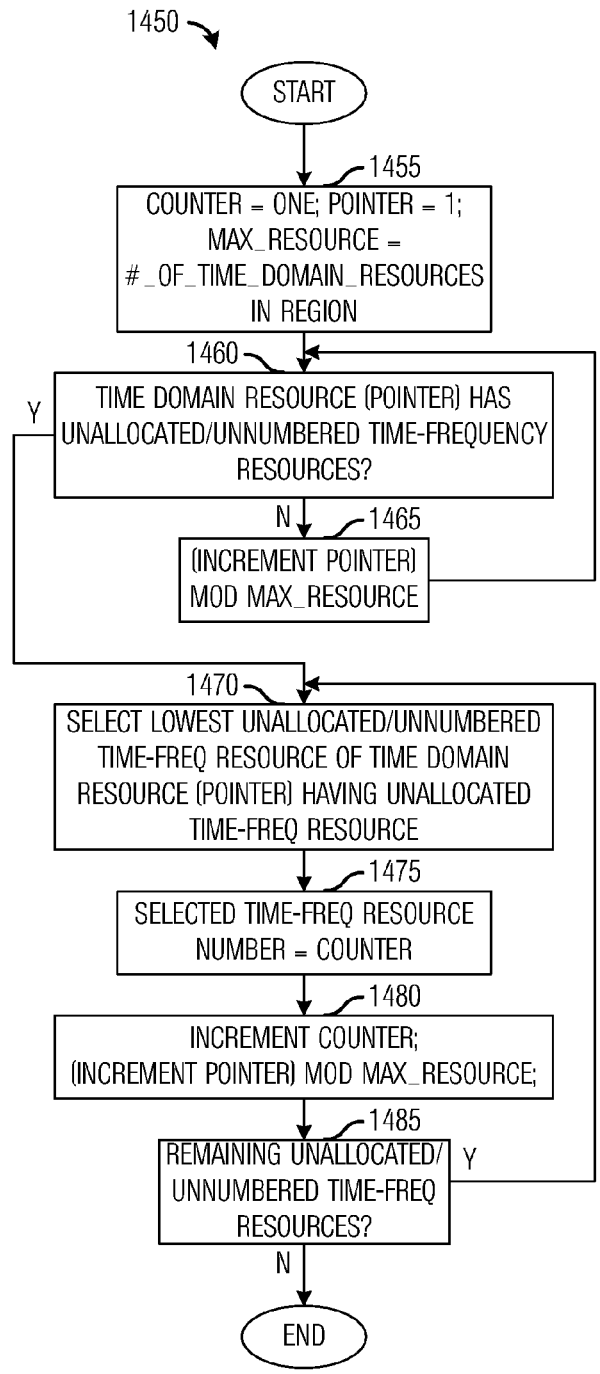
FIG. 14b is a flow diagram of an alternate resource hole numbering algorithm.

FIG. 14b illustrates a flow diagram of an algorithm 1450 for numbering resource holes in a region, wherein algorithm 1450 attempts to improve communications performance. Algorithm 1450 may be representative of events taking place in a BS or a MS of a communications system when numbering resource holes. Algorithm 1450 may occur at regularly scheduled times, or at the occurrence of an event. For example, a MS may number resource holes when it receives a message from a BS instructing it to do so, a BS may number resource holes after it has allocated and released resource holes a specified number of times, and so forth.

Resource hole numbering may begin with an initializing of several variables (block 1455). The variables renumbered may include a counter "COUNTER" initialized to the value one (1), a pointer "POINTER" initialized to the value one (1), a variable "MAX_RESOURCE" initialized to a number of time domain resources in the region. Alternatively, the variables may be initialized to other agreed upon starting values.

After initializing COUNTER, POINTER, and MAX_RESOURCE, a check to determine if time domain resource (POINTER), i.e., a POINTER-th time domain resource, has unallocated/unnumbered time-frequency resources (block 1460). If the time domain resource (POINTER) does not have unallocated/unnumbered time-frequency resources, then POINTER may be incremented modulo MAX_RESOURCE (block 1465) and block 1460 repeated.

If the time domain resource (POINTER) does have unallocated/unnumbered time-frequency resources, then a selection of a lowest unallocated/unnumbered time-frequency resource of time domain resource (POINTER) may be made (block 1470). After selecting the lowest unallocated/unnumbered time-frequency resource, the selected time-frequency resource may be numbered the value of COUNTER (block 1475). Once the selected time-frequency resource has been numbered, COUNTER and POINTER may be incremented (block 1480). POINTER may be incremented using modulo MAX_RESOURCE, for example.

After updating COUNTER and POINTER, a check may be made to determine if there are any remaining unallocated/unnumbered time-frequency resources (block 1485). If there are no more remaining unallocated/unnumbered time-frequency resources, then the numbering of resource holes may terminate. If there are remaining unallocated/unnumbered time-frequency resources, then the numbering of resource holes may return to block 1470 to select a lowest unallocated/unnumbered time-frequency resource of time domain resource (POINTER). The numbering of unallocated/unnumbered time-frequency resources may continue as described above.

Although the discussion of the numbering of resource holes presented above begins by initializing COUNTER and POINTER to one (1), increments both COUNTER and POINTER, alternative embodiments may begin by initializing COUNTER to a number of unallocated/unnumbered time-frequency resources, POINTER to a number of time domain resources, and decrements COUNTER and POINTER. Furthermore, instead of starting with a lowest time-frequency resource, the numbering of resource holes may start with a highest time-frequency resource. Therefore, the discussion of the numbering of resource holes presented above should not be construed as being limiting to either the scope or the spirit of the embodiments.

Figure 15A:
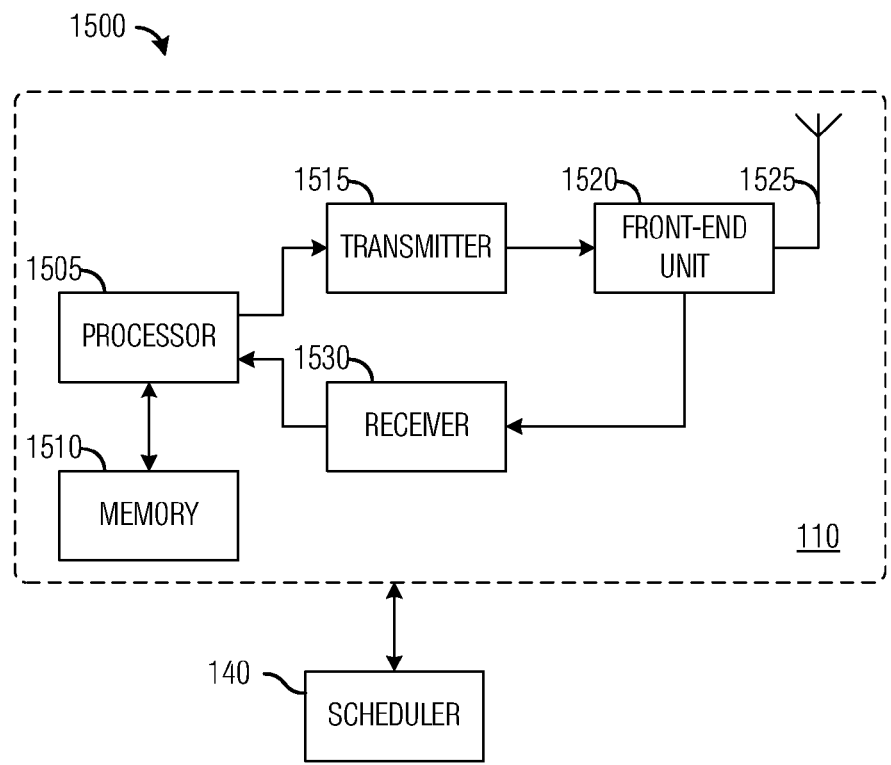
FIG. 15a is a diagram of a communications device.

FIG. 15a illustrates a detailed view of a communications device 1500 for use in controlling the operation of a wireless communications network, such as an OFDMA communications network. The communications device 1500 may include a BS 110 and a scheduler 140. BS 110 may be used to coordinate communications for a number of MS operating in the wireless communications network, as well, as allowing communications between multiple MS and between an MS and BS 110. Scheduler 140 may be used in the assigning of radio resources, enabling a sharing of a common communications medium. For example, BS 110 may provide a time-frequency resource request to scheduler 140 and scheduler 140 may return a time-frequency resource number and an offset, a starting time-frequency resource number and an ending time-frequency resource number satisfying the time-frequency resource request, a starting time-frequency resource number and an offset and a number of time frequency resources, a starting time-frequency resource number and a number of time frequency resources, a starting time-frequency resource number and a time duration, or a flag indicating that the time-frequency resource request may not be satisfied.

BS 110 may include a processor 1505 that may be used to process signals to be transmitted and/or signals received. Processor 1505 may also be used to execute applications, etc. For example, processor 1505 may execute applications that may be needed to coordinate transmissions by MS in communications with BS 110. This may help maximize radio resource sharing while minimizing transmission collisions, errors, and so on. Depending on embodiment, processor 1505 may be implemented as several different processors, such as a digital baseband processor and/or a general purpose processor. Processor 1505 may store data, information, applications, and so forth, in a memory 1510. Processor 1505 may provide data to be transmitted to a transmitter 1515 that may process the data for transmission, which may include encoding, spreading, mixing, filtering, interleaving, and so forth. The data processed for transmission may then be provided to a front-end unit 1520, which may include filters, duplexers, transmit/receive switches, signal amplifiers, and so forth. An antenna (or antennas) 1525 may then transmit the data over-the-air.

In addition to transmitting the data, antenna 1525 may also receive data. Depending on embodiment, separate antennas may be used for transmission and reception, or antenna 1525 may be shared. Received data detected by antenna 1525 may be provided to front-end unit 1520 where it may be filtered, amplified, and so on. A receiver 1530 may then be provided the received signal, wherein receiver 1530 may process the received signal to produce data usable by processor 1505. Receiver 1530 may be used to perform operations such as error detection and correction, filtering, despreading, down-conversion, and so forth.

Figure 15B:
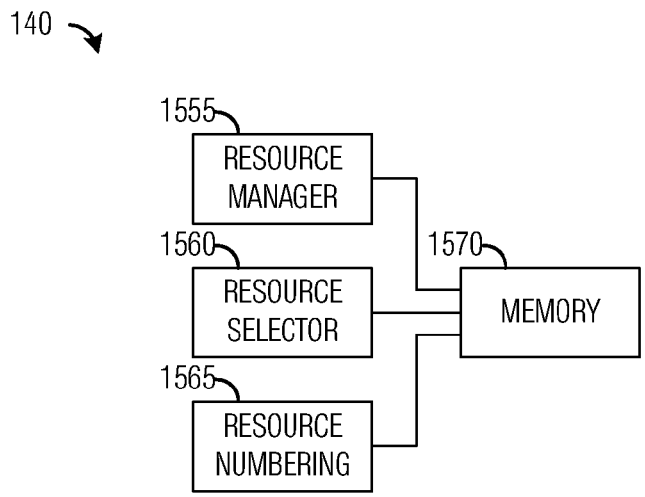
FIG. 15b is a diagram of a scheduler.

FIG. 15b illustrates a detailed view of scheduler 140. As discussed previously, scheduler 140 may be used to assign radio resources, such as, time-frequency resources, to MS requesting resources for transmitting and/or receiving information. Scheduler 140 may include a resource manager 1555. Resource manager 1555 may be used to maintain information on available radio resources, such as, time-frequency resources. Resource manager 1555 may keep track of which radio resources have been assigned for use, how long have they been assigned, when they will become free, and so forth. Furthermore, when the BS decides to service a time-frequency resource request, resource manager 1555 may be used to find unassigned time-frequency resources that fulfill the time-frequency resource request.

Scheduler 140 may also include a resource selector unit 1560. Resource selector unit 1560 may select one or more resource holes in a region to fulfill the time-frequency resource request. Resource selector unit 1560 may select the resource holes based on information provided by resource manager 1555. Resource selector unit 1560 may use techniques to help attain performance goals, such as reduce fragmentation of the time-frequency resources, maximize time-frequency resource utilization, utilization of available bandwidth, maximize a number of MS time-frequency resource requests, minimize time-frequency resource request wait time, and so forth. Attaining some of the above listed goals may make it not possible to attain some of the other listed goals. Resource selector unit 1560 may have the capability of selecting which goals to maximize.

Scheduler 140 may also include a resource numbering unit 1565. Resource numbering unit 1565 may be used to number resources holes within a region using resource hole numbering algorithms such as those described in FIGS. 14a and 14b. Resource numbering unit 1565 may number resource holes in a periodic manner or upon an occurrence of an event. Examples of events may include a number of time-frequency resource allocations and de-allocations, upon receipt of a request to perform resource hole number, and so forth. In addition to being located in scheduler 140, a MS may also include a resource number unit to help ensure that both BS and MS are using a consistent numbering for resource holes.

Resource manager 1555, resource selector 1560, and resource numbering unit 1565 may be coupled to a memory 1570. Memory 1570 may be used to store time-frequency resource allocations, time-frequency resource allocation expiration times, resource holes, resource hole numbering, and so forth.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for operating a base station in a communications system, the method comprising:
   receiving a resource request for radio resources for a mobile station, wherein the radio resources comprise time domain resources, frequency domain resources, and time-frequency resources;
   transmitting an indication of unallocated radio resources to the mobile station;
   numbering the unallocated radio resources to produce a sequentially numbered list of unallocated resources, wherein numbering the unallocated radio resources comprises
   a) initializing a counter;
   b) selecting a lowest time domain resource having unallocated and unnumbered time-frequency resources;
   c) selecting a lowest unallocated and unnumbered time-frequency resource of the selected time domain resource;
   d) numbering the selected time-frequency resource equal to the counter;
   e) incrementing the counter;
   f) selecting a next time domain resource modulo a number of time domain resources having unallocated and unnumbered time-frequency resources; and g) repeating the steps b, c, d, e, and f until there are no more time domain resources having unallocated and unnumbered time-frequency resources;

determining a resource assignment for the resource request, wherein the resource assignment comprises at least one of the indicated unallocated radio resources and a number of radio resources; and transmitting the resource assignment to the mobile station.

2. The method of claim 1, wherein the indication comprises a de-assignment message used to release previously assigned radio resources.

3. The method of claim 1, further comprising communicating with the mobile station using the radio resources of the resource assignment.

4. The method of claim 1, wherein transmitting the resource assignment comprises transmitting a number of a starting time-frequency resource and a number of an ending time-frequency resource.

5. The method of claim 1, wherein transmitting the resource assignment comprises transmitting a number of a starting time-frequency resource, an offset, and a number of time-frequency resources.

6. The method of claim 1, wherein transmitting the resource assignment comprises transmitting a number of a starting time-frequency resource and a number of time-frequency resources in the resource assignment.

7. The method of claim 1, wherein transmitting the resource assignment comprises transmitting a number of a starting time-frequency resource and a duration.

8. The method of claim 1, wherein the resource assignment is transmitted in a sub-assignment message.

9. The method of claim 8, wherein there are multiple resource assignments, and wherein an N-th resource assignment begins at a time-frequency resource numerically adjacent to an end of an (N−1)-th resource assignment.

10. A method for operating a mobile station in a communications system, the method comprising:

receiving an indication of unallocated radio resources from a base station, wherein the radio resources comprise time domain resources, frequency domain resources, and time-frequency resources, and wherein the unallocated radio resources are in a sequentially numbered list of unallocated resources, the list having been generated by a) initializing a counter;

b) selecting a lowest time domain resource having unallocated and unnumbered time-frequency resources;

c) selecting a lowest unallocated and unnumbered time-frequency resource of the selected time domain resource;

d) numbering the selected time-frequency resource equal to the counter;

e) incrementing the counter;

f) selecting a next time domain resource modulo a number of time domain resources having unallocated and unnumbered time-frequency resources; and g) repeating the steps b, c, d, e, and f until there are no more time domain resources having unallocated and unnumbered time-frequency resources;

receiving a resource assignment from the base station, wherein the resource assignment comprises an assignment of at least one of the indicated unallocated radio resources and a number of radio resources; and determining assigned radio resources from the resource assignment.

11. The method of claim 10, further comprising communicating with the base station using the assigned radio resources of the resource assignment.

12. The method of claim 10, further comprising numbering unallocated radio resources, wherein numbering the unallocated resources produces a sequentially numbered list of unallocated resources.

13. The method of claim 12, wherein the resource assignment comprises a number of a starting time-frequency resource and a number of an ending time-frequency resource, and wherein the assigned radio resources comprises the starting time-frequency resource, the ending time-frequency resource, and time-frequency resources in between.

14. The method of claim 12, wherein the resource assignment comprises a number of a starting time-frequency resource, an offset, and a number of time-frequency resources, and wherein the assigned radio resources comprises the number of time-frequency resources starting at the starting time-frequency resource plus the offset.

15. The method of claim 12, wherein the resource assignment comprises a starting time-frequency resource and a number of time-frequency resources, and wherein the assigned radio resources comprises the number of time-frequency resources starting at the starting time-frequency resource.

16. The method of claim 12, wherein the resource assignment comprises a starting time-frequency resource and a duration, and wherein the assigned radio resource comprises a number of time-frequency resources about equal to the duration starting at the starting time-frequency resource.

17. The method of claim 12, wherein numbering the unallocated radio resources uses an algorithm that is identical to a numbering algorithm used in the base station to number unallocated radio resources.

18. The method of claim 12, wherein numbering the unallocated radio resources comprises receiving a list of unallocated radio resource numbers.

19. An electronic device comprising:

a base station configured to coordinate communications of a mobile station associated with the base station, wherein communications are coordinated using resource requests transmitted to the base station; and a scheduler coupled to the base station, the scheduler configured to determine allocatable radio resources based on a resource request, wherein the radio resources comprise time domain resources, frequency domain resources, and time-frequency resources, with the allocatable radio resources comprising unallocated resources, wherein the unallocated resources have been indicated to the mobile station by a plurality of resource numbers being sequentially numbered and allocated based on the numbering, the scheduler configured to assign resources, and the scheduler configured to update assigned resources, wherein the scheduler comprises a resource numbering unit configured to a) initialize a counter;

b) select a lowest time domain resource having unallocated and unnumbered time-frequency resources;

c) select a lowest unallocated and unnumbered time-frequency resource of the selected time domain resource;

d) number the selected time-frequency resource equal to the counter;

e) increment the counter;

f) select a next time domain resource modulo a number of time domain resources having unallocated and unnumbered time-frequency resources; and g) repeat the steps b, c, d, e and f until there are no more time domain resources having unallocated and unnumbered time-frequency resources.

20. The electronic device of claim 19, wherein the scheduler further comprises:
    a resource manager coupled to the resource numbering unit and configured to maintain assignments of resources and to find a list of unallocated resources capable of fulfilling a resource request; and
    a resource selector unit coupled to the resource manager, the resource selector unit configured to select for assignment resources from the list of unallocated resources capable of fulfilling a resource request.

21. A method for operating a base station in a communications system, the method comprising:
    receiving a resource request for radio resources for a mobile station, wherein the radio resources comprise time domain resources, frequency domain resources, and time-frequency resources;
    transmitting an indication of unallocated radio resources to the mobile station;
    numbering the unallocated radio resources to produce a sequentially numbered list of unallocated resources, wherein numbering the unallocated radio resources comprises
        1) initializing a counter;
        2) selecting a lowest numbered time domain resource having unallocated and unnumbered time-frequency resources;
        3) selecting a lowest unallocated and unnumbered time-frequency resource;
        4) numbering the selected time-frequency resource equal to the counter;
        5) incrementing the counter;
        6) repeating the steps 3, 4, and 5 for remaining unallocated and unnumbered time-frequency resources in the selected time domain resource; and
        7) repeating the steps 3, 4, 5, and 6 for remaining time domain resources having unallocated and unnumbered time-frequency resources;
    determining a resource assignment for the resource request, wherein the resource assignment comprises at least one of the indicated unallocated radio resources and a number of radio resources; and
    transmitting the resource assignment to the mobile station.

22. The method of claim 21, further comprising communicating with the mobile station using the radio resources of the resource assignment.

23. An electronic device comprising:
    a base station configured to coordinate communications of a mobile station associated with the base station, wherein communications are coordinated using resource requests transmitted to the base station; and
    a scheduler coupled to the base station, the scheduler configured to determine allocatable radio resources based on a resource request, wherein the radio resources comprise time domain resources, frequency domain resources, and time-frequency resources, with the allocatable radio resources comprising unallocated resources, wherein the unallocated resources have been indicated to the mobile station by a plurality of resource numbers being sequentially numbered and allocated based on the numbering, the scheduler configured to assign resources, and the scheduler configured to update assigned resources, wherein the scheduler comprises a resource numbering unit configured to
        1) initialize a counter;
        2) select a lowest numbered time domain resource having unallocated and unnumbered time-frequency resources;
        3) select a lowest unallocated and unnumbered time-frequency resource;
        4) number the selected time-frequency resource equal to the counter;
        5) increment the counter;
        6) repeat the steps 3, 4, and 5 for remaining unallocated and unnumbered time-frequency resources in the selected time domain resource; and
        7) repeat the steps 3, 4, 5, and 6 for remaining time domain resources having unallocated and unnumbered time-frequency resources.

24. The electronic device of claim 23, wherein the scheduler further comprises:
    a resource manager coupled to the resource numbering unit and configured to maintain assignments of resources and to find a list of unallocated resources capable of fulfilling a resource request; and
    a resource selector unit coupled to the resource manager, the resource selector unit configured to select for assignment resources from the list of unallocated resources capable of fulfilling a resource request.

25. The electronic device of claim 23, wherein the base station is configured to communicate with the mobile station using the radio resources of the resource assignment.

* * * * *